United States Patent [19]

Lew

[11] 4,286,922
[45] Sep. 1, 1981

[54] VARIABLE CAMBER FLUID POWER MACHINE

[76] Inventor: Hyok S. Lew, 7890 Oak St., Arvada, Colo. 80005

[21] Appl. No.: 63,141

[22] Filed: Aug. 2, 1979

Related U.S. Application Data

[63] Continuation-in-part of Ser. No. 952,471, Oct. 18, 1978, abandoned.

[51] Int. Cl.³ .............................................. F03D 3/06
[52] U.S. Cl. ....................................... 416/17; 416/24
[58] Field of Search ............... 416/17, 23, 24, DIG. 6, 416/DIG. 5

[56] References Cited

U.S. PATENT DOCUMENTS

| | | |
|---|---|---|
| 1,430,406 | 9/1922 | Schulthes et al. .................... 416/119 |
| 1,953,444 | 4/1934 | Stalker .............................. 416/17 X |
| 2,622,686 | 12/1952 | Chevreau et al. ................. 416/41 X |
| 3,295,827 | 1/1967 | Chapman et al. ............. 416/DIG. 5 |
| 4,137,009 | 1/1979 | Telford ................................... 416/24 |
| 4,178,126 | 12/1979 | Weed .................................... 416/17 |
| 4,247,251 | 1/1981 | Wuenscher ............................ 416/24 |

FOREIGN PATENT DOCUMENTS

| | | |
|---|---|---|
| 1028626 | 3/1978 | Canada ..................................... 416/17 |
| 482607 | 9/1929 | Fed. Rep. of Germany ............. 416/23 |
| 915892 | 11/1946 | France .................................... 416/17 |
| 2289764 | 5/1976 | France ..................................... 416/17 |
| 2289769 | 5/1976 | France ..................................... 416/17 |
| 2290585 | 6/1976 | France ................................. 416/132 B |
| 1410175 | 10/1975 | United Kingdom ..................... 416/23 |

Primary Examiner—Everette A. Powell, Jr.

[57] ABSTRACT

A device converting the kinetic energy belonging to the moving stream of fluid such as the wind, river stream and gulf stream is disclosed. Said device is comprised of two or more blades revolving about the central axis, which blades are mechanically linked to said central axis wherein each of said blades completes a half rotation about its own axis when it completes a complete revolution about said central axis. Each of blades further includes a pair of flaps rotatably disposed on each edge of said blade, which flaps are mechanically linked to the rotating and revolving motion of the blade wherein said flaps are automatically deflected to provide a suitable camber to the blades to generate a lift force on the blade. In said arrangement, the blade and flaps line up automatically with the fluid stream direction when it occupies the minimum drag position in revolving about said central axis, while the blade takes up automatically a position perpendicular to the wind direction when it occupies the maximum drag position which is the diametrically opposite position to said minimum drag position wherein a hypothetical line connecting said two positions are generally perpendicular to the fluid stream direction.

5 Claims, 5 Drawing Figures

VARIABLE CAMBER FLUID POWER MACHINE

The present patent application is a CONTINUATION-IN-PART of a patent application entitled "FLUID POWER MACHINE" filed by this inventor on Oct. 18, 1978 and assigned Ser. No. 952,471, now abandoned.

The present invention relates to a device converting the kinetic energy belonging to the moving fluid stream such as the wind, river stream, gulf-stream and ocean thermal currents, to a usable mechanical energy in the form of the rotating motion with a torque.

The primary object of the present invention is to provide a fluid power machine utilizing the drag force as well as the lift force on the blades in creating the rotating motion with a torque.

Another object of the present invention is to maximize the lift force on the blades of the fluid power machine by means of the variable camber created by a pair of flaps respectively attached to both edges of the blade.

A further object of the present invention is to provide a fluid power machine generating the greatest possible power for its bulk and weight.

Yet another object of the present invention is to provide a fluid power machine requiring the minimum structural strength in its structure.

Still a further object of the present invention is to provide a fluid power machine requiring the minimum complexity in the mechanisms automatically controlling the motion of the flaps on the blades.

Yet a further object of the present invention is to provide a fluid power machine which is inexpensive and easy to install, operate and maintain.

These and other objects of the present invention will become clear as the description of the present invention proceeds. The present invention may be described with great clarity and specificity by referring to FIGS. 1, 2, 3, 4 and 5.

Figure 1:
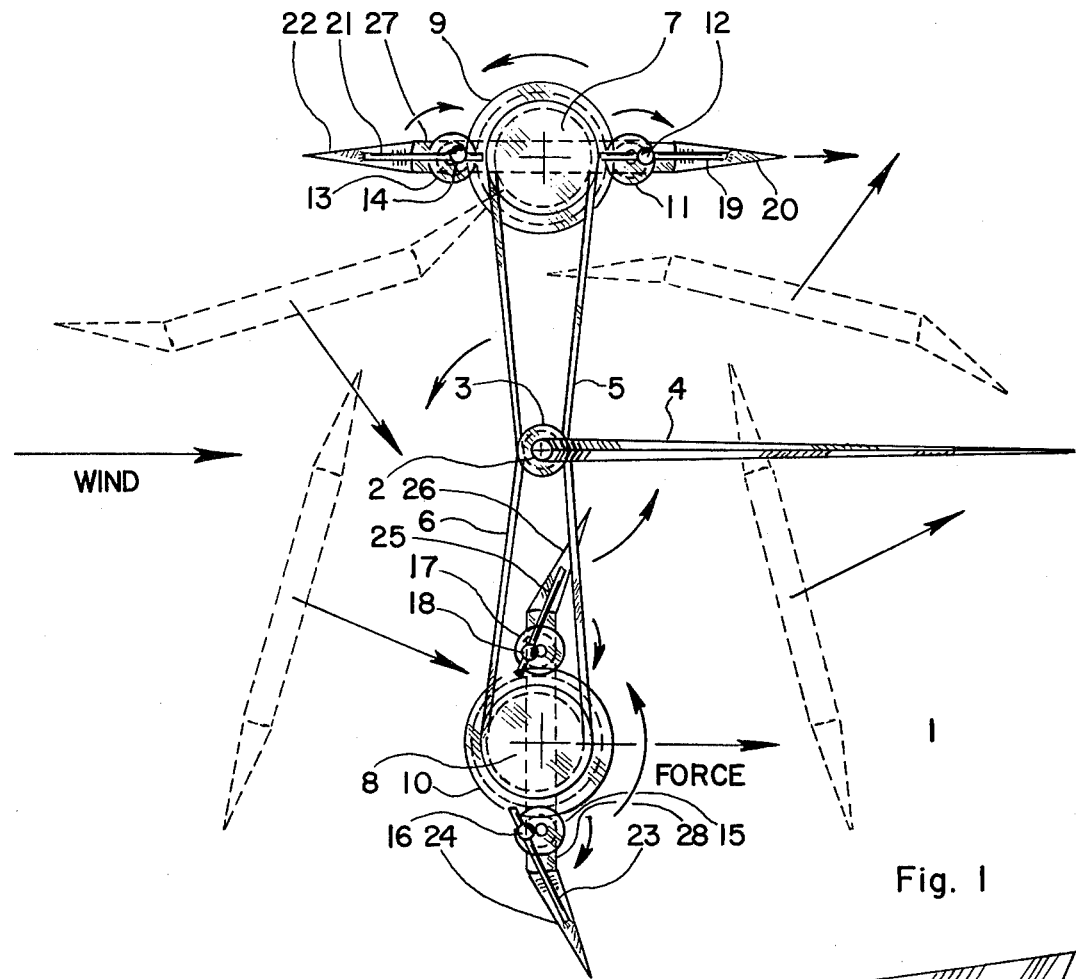
FIG. 1 illustrates a plan view of a variable camber fluid power machine constructed in accordance with the principles taught by the present invention.
Figure 2:
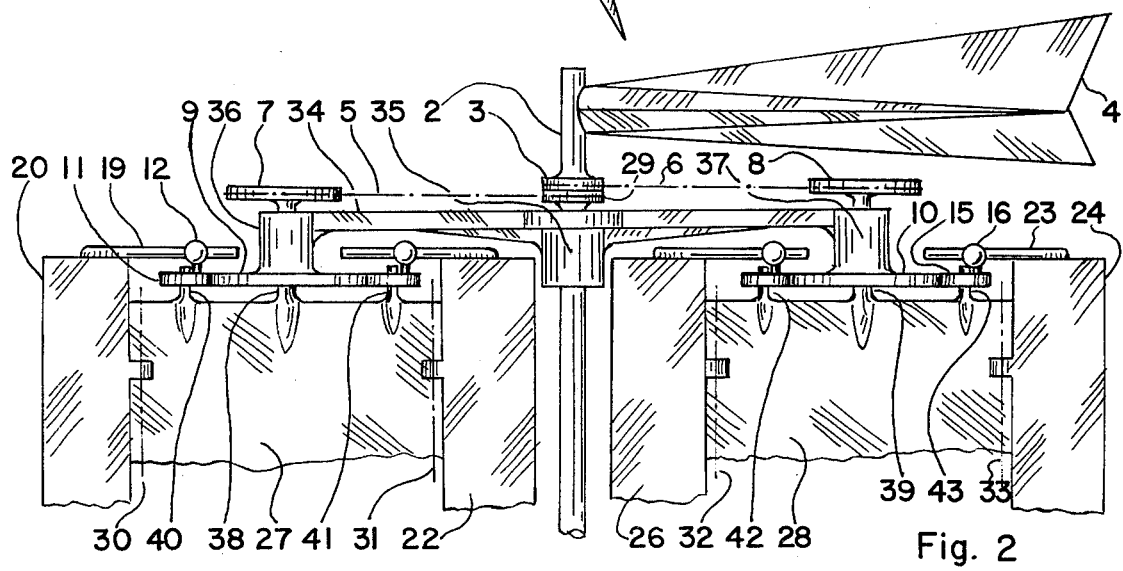
FIG. 2 illustrates an embodiment of the mechanical transmission means employed in an illustrative embodiment of the present invention shown in FIG. 1.

In FIGS. 1 and 2, there is shown a fluid power machine 1 constructed in accordance with the principle taught by the present invention. A central axis 2 and a pair of central sprockets 3 and 29 nonrotatably mounted there-to provides the axis about which the blades 27 and 28 are rotating. In general, any number of blades may be disposed axisymmetrically about the central axis although a odd-numbered blade disposal may be advantageous as such a combination exposes all blades to the fluid stream uniformly. The central axis 2 may be a non-rotatably fixed axis as in the case of the fluid power machine applied to a water stream in the river, or it may be a rotatable axis operated by a rudder 4 as shown in FIG. 1. The blades 27 and 28 are rotatably mounted, respectively, on two extremity of the arm 34 rotatably disposed on the central axis 2 by means of the bearing 35. The journals 38 and 39 rigidly affixed to the center line of the blades 27 and 28, respectively, are rotatably engaging the bearings 36 and 37 disposed on the two extremity of the arm 34, respectively. On the extremity of the journals 38 and 39, the blade sprockets 7 and 8 are rigidly affixed, respectively, which sprockets are linked to the central sprockets 3 and 29 non-rotatably mounted on the central axis 2 by means of the chains 5 and 6, respectively. The blade sprockets 7 and 8 have twice as many teeth as that of the central sprockets 3 and 29, respectively, whereby, the blades 27 and 28 rotates about their centerline at a half of the angular velocity of the revolution of the blades about the central axis. A pair of journals 40 and 41 are disposed to the blade 27 symmetrically about and parallel to the journal 38.

A pair of the flap gears 11 and 13, respectively, including the slide bearings 12 and 13 eccentrically and rotatably disposed onto said gears engage the journals 40 and 41, respectively, which gears are linked to the arm gear 9 rigidly and coaxially affixed to the bearing 36 on the arm 34. A pair of flaps 20 and 22 are rotatably attached to the opposing edges of the blade 27, respectively, each of which flaps are rotatable about axis 30 and 31, respectively. A pair of sliding rods 19 and 21 rigidly affixed to and tangentially extending from the flaps 20 and 22, respectively, engage the slide bearings 12 and 14 in a sliding relationship, respectively. The flap gears 11 and 13 have the number of teeth equal to one third of the number of teeth of the arm gear 9. In similar arrangement, the blade 28 includes a pair of journals 42 and 43 with a pair of rotatably mounted flap gears 15 and 17, respectively, each of said gears having a pair of slide bearings 16 and 18, respectively; the pair of flaps 24 and 26 attached to the edges of the blade 28 and rotatable about axis 32 and 33, respectively; a pair of sliding rods 23 and 25 respectively affixed to the flaps 24 and 26, slidably engaging the slide bearings 16 and 18, respectively, and the arm gear 10 to which the flap gears 15 and 17 are engaged. The lower half of the fluid power machine is constructed the same as the upper half shown in FIG. 2.

Figure 3:
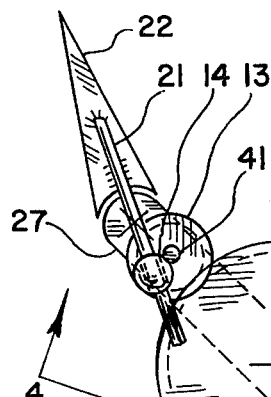
FIG. 3 shows an embodiment of a mechanical means used to deflect the flaps in varying the camber of the blade of a variable camber fluid power machine.
Figure 4:
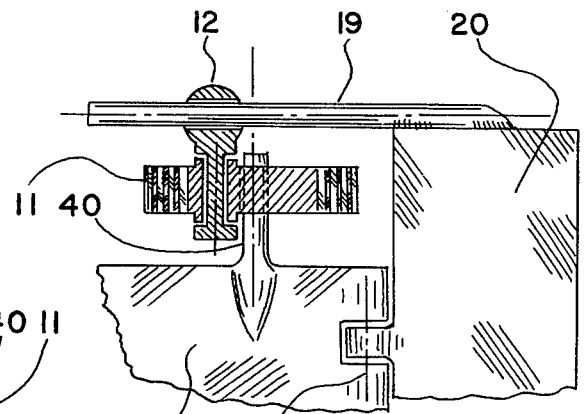
FIG. 4 shows a cross section view taken along a plane 4—4 as shown in FIG. 3.

The detail of the arrangement of the assembly including an arm gear, a pair of flap gears and the linkage of the flap gear to the flap, which assembly is employed in the construction of the fluid power machine shown in FIGS. 1 and 2, is described in FIG. 3 and further in FIG. 4 showing a cross section view taken along a plane 4—4 as shown in FIG. 3.

With said arrangement of parts in the fluid power machine shown in FIGS. 1 and 2, the fluid power machine operates in the following principle: The blades rotate about their own axis at the half of the anglular velocity at which the blades revolve about the central axis of the fluid power machine since the blade sprocket and the central sprocket are ratioed to 2 to 1. Once the blades are assembled to take a position tangential to the circle, which is traced by the blades in their revolving motion about the central axis, at the minimum drag position, the blades rotate to 30°, 60°, 90° 120°, and 150° about their own axis as they revolves to 60°, 120°, 180°, 240° and 300° positions about the central axis, respectively. Such series of positions of the blade is shown in FIG. 1. The arm gears rigidly affixed to the rotating arm supporting the blades rotate at the same angular velocity as that of the arm and, consequently, the anular velocity of a blade relative to an arm gear is equal to one half to that of the angular motion of the blades about the central axis. The gear ratio between an arm gear and a flap gear is equal to 3 to 1. Therefore, the flap gears rotates at an angular velocity equal to 1.5 times that of the angular motion of the blades about the central axis. Once the flap gear is set in such a way that both of the flaps line up with the blade at the minimum drag position and that the pair of the slide bearings are positioned to rotate the pair of the flaps in two opposing directions which rotation creates a camber on the blade assembly favorable to create the lift force generating a torque in the same direction as that resulting from the difference in the drag force on the blades between the minimum and the maximum drag positions, it is not difficult to realize that the maximum camber is provided to the blade assembly when it is revolved to 60°, 180° and 300° positions about the central axis, which angle is measured from the minimum drag position. The position of the flaps and blades at 0° (the minimum drag position), 60°, 120°, 180° (the maximum drag position), 240° and 300° revolutions of the blades about the central axis are shown in FIG. 1. Based on the well known aerodynamic principle, it is obvious that the blades located in the revolution ranges of 0° to 90° and 270° to 360° contribute in creating the torque in a greater extent compared with the case of the blade without flaps because of the maximum camber provided at 60° and 240° positions. The maximum camber produced at 180° may reduce the drag on the blade assembly slightly. However, the gain of the lift force from the maximum cambers at 60° and 240° positions for over weigh the loss of drag at 180° position. The rudder 4 rigidly affixed to the central shaft automatically line up the plane of the minimum-maximum drag positions perpendicular to the wind direction.

It should be noticed that the maximum camber takes place at 60°, 180° and 300° position of the rotation as mentioned above only when the distance between the flap axis 30 and the axis 40 of the flap gear 11 is much greater than the distance from the axis 40 of the flap gear 11 to the slide bearing 12, which distances are illustrated in FIGS. 3 and 4. However, when said two distances are of comparable lengths to one another, the maximum camber takes place earlier or later than 60°, 180° and 300° position of the rotation depending on whether the sliding bearing is initially lined up on the plane of the blade intermediate the flap gear axis and the blad axis or intermediate the flap axis and the flap gear axis. Consequently, the embodiment illustrated in FIGS. 3 and 4 enables to design the maximum camber to take place at angles of the rotation less, greater or equal to 60°, less or greater or equal to 180° and less, greater or equal to 300° as required by different environment and operating requirements.

Figure 5:
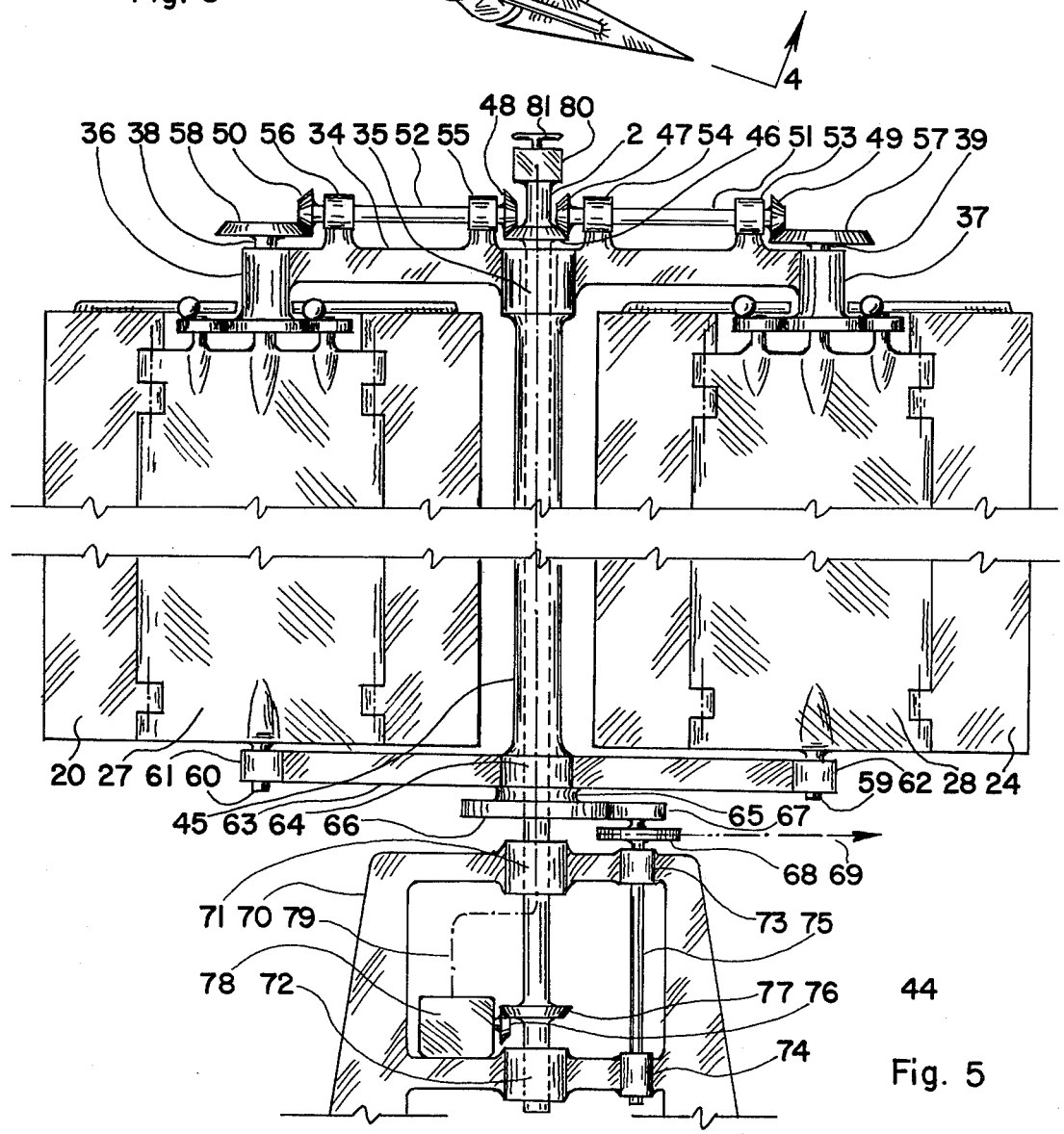
FIG. 5 illustrates another embodiment of the mechanical transmission means employed in constructing a variable camber fluid power machine.

In FIG. 5 there is shown another embodiment of the fluid power machine 44 constructed in accordance with the principle taught by the present invention, which fluid power machine has essentially the same blade assembly as that shown in FIG. 1. However the bevel gear link substitutes the chain link and the servo-motor control eliminates the rudder system in lining up the fluid power machine to the fluid stream in this embodiment. The blade assembly shown in FIG. 5 is essentially same as that shown in FIG. 1 and 2 apart from the fact the a apir of the blade bevel gears 57 and 58 replace the blade sprockets 7 and 8, respectively. The blade bevel gears 57 and 58 are linked to the central bevel gear 46 nonrotatably affixed to the central shaft 2 by means of the bevel gear shaft assemblies 47-51-49 and 48-52-50, respectively, which bevel gear assemblies are rotatably supported by bearing assemblies 53-54 and 55-56, respectively. In this embodiment, the lower end of the blade assemblies are simply supported by a pair of the bearing 61 and 62 disposed to extremities of the lower arm 63 with a bearing 64 rotatably mounted on the central shaft 2, which bearing 64 is rigidly connected to the upper bearing 35 by a tubing 45 for the strength. A pair of journals 59 and 60 rigidly affixed to the lower end of the blades 28 and 27, respectively, rotatably engages the bearings 62 and 61, respectively. A gear 66 rigidly and coaxially affixed to the arm 63 by means of the hub 65 engages another gear 67 rigidly mounted on the power-take-off shaft 75 which is rotatably supported by a pair of bearings 73 and 74. The power is taken off by means of a chain 69 and sprocket 68 (or a direct gear engagement) rigidly mounted on the power-take-off shaft 75. The central axis 2 is rotatably supported by the frame 70 by means of a pair of bearings 71 and 72 (for water mill application, this central axis may be rigidly affixed to the frame since there is no need of adjusting the fluid power machine to the constant fluid stream direction). The means for lining up the fluid power machine to the fluid stream direction is provided by the electro-mechanical control system comprising the wind direction sensor 81, transmitter 80, transmitting cable 79, servo-motor 78 and a bevel gear system 76 and 77.

Of course, the mechanical transmission means from the arm gear 9 to the flap gears 11 and 13, and from the arm gear 10 to the flap gears 15 and 17 shown in FIGS. 1 and 2, and FIG. 5 can be easily replaced by a chain drive system wherein the arm gears 9 and 10 are replaced by a pair of arm sprockets and the flap gears 11, 13, 15 and 17 are replaced by four flap sprockets, each of which flap sprockets is linked to each of said arm sprockets by a chain. It is obvious that the timing belts in place of the chains and the timing pullies in place of the sprockets may be employed. It should be noticed that the mode of deflection of the flap is independent of the direction of the rotation of the flap gears or flap sprockets while it depends only on the initial phase setting of the linking system between the flaps and the flap gears or flap sprockets. For example, the mode of the flap deflection remains the same if the linkage between the flap and the flap gear or the flap sprocket is shifted over 180 degree phase angle when the direction of rotation of the flap gear or the flap sprocket is reversed.

While the principle of the invention have now been made clear in an illustrative embodiment there will be immediately obvious to those skilled in the art many modifications of structure, arrangements, proportions, the elements, materials and components used in the practice of the invention which are particularly adapted for specific environments and operating requirements without departing from these principles.

I claim:

1. A variable camber fluid power machine for converting the kinetic energy of the moving fluid stream to a useful mechanical energy in the form of rotating motion with a torque, said variable camber fluid power machine comprising:
   (a) a central shaft having means for indexing the angular position of said central shaft about the axis of said central shaft relative to the fluid stream direction;

(b) a plurality of arms extending axisymmetrically from said central shaft, said plurality of arms being rotatable about said central shaft;

(c) a plurality of oblong blades, each of said plurality of oblong blades rotatably disposed to the extremity of each of said plurality of arms wherein each of said plurality of oblong blades is allowed to revolve about said central shaft and at the same time is rotatable about the center line of each of said plurality of oblong blades, said center line being generally parallel to said central shaft;

(d) a first plurality of mechanical transmission means linking the rotating motion of each of said plurality of oblong blades about the center line of each oblong blade to the revolving motion of said oblong blade about said central shaft relative to said central shaft wherein each of said plurality of oblong blades rotates at an angular velocity equal to one half of the angular velocity of the revolving motion of said oblong blade about said central shaft wherein each of said plurality of oblong blades takes a position generally tangential to the revolving path of said oblong blade at the minimum drag position and takes a position generally perpendicular to said revolving path at the maximum drag position, said maximum drag position being diametrically located to said minimum drag position with respect to said central shaft;

(e) a plurality of pair of flaps, each of said pair of flaps pivotably attached to each edge of each of said plurality of oblong blades, each of said flaps being pivotable about axis parallel to the edge of said oblong blade; and (f) a second plurality of mechanical transmission means linking the pivoting motion of each pair of said plurality of flaps to the rotating motion of each of said plurality of oblong blades wherein each pair of said flaps generally line up with said oblong blade to which said pair of flaps are attached, at 0 degree, 120 degree and 240 degree revolving positions about said central shaft, said revolving positions measured from said minimum drag position in the direction of the revolving motion of said plurality of oblong blades about said central shaft, and are deflected toward to one another at other revolving positions providing a camber to the blade-flaps assembly creating an additional lift force to generate a torque about said central shaft in the direction of the revolving motion of said blade-flaps assembly about said central shaft wherein the maximum camber is provided at 60 degree, 180 degree and 300 degree revolving positions, said revolving positions measured in said manner.

2. The combination as set forth in claim 1 wherein;

(a) said a first plurality of mechanical transmission means comprise a plurality of blade gears or blade sprockets, each of said blade gears or blade sprockets rigidly affixed to each of said plurality of oblong blades wherein the axis of said blade gear or blade sprocket generally coincides with said center line of said oblong blade, and a central gear or central sprockets rigidly affixed to said central shft; wherein, each of said blade gears or blade sprockets is mechanically linked to said central gear or central sprocket in nonsliping relationship to produce a rotating motion of said blade at an angular velocity equal to one half of the angular velocity of the revolving motion of said blade about and relative to said central axis; and (b) said a second plurality of mechanical transmission means comprise;

(1) a plurality of pairs of flap gears, each pairs of said plurality of flap gears rotatably disposed on a pair of shafts rigidly affixed to each of said plurality of oblong blades axisymmetrically and parallel to said center line of said oblong blade, each of said pair of shafts located intermediate said center line of said oblong blade and the pivotal axis of said flap;

(2) a plurality of pairs of slide bearing, each of said pair of slide bearing eccentrically and rotatably disposed on one face of each of said pair of flap gears;

(3) a plurality of pairs of sliding rods, each of said pair of sliding rods rigidly affixed to each of said pair of flaps and slidably engaging each of said pair of slide bearings; and (4) a plurality of arm gears, each of said plurality of arm gear nonrotatably affixed to each of said plurality of arms at said center line of oblong blade attached to said arm and simultaneously engaging both of said pair of flap gears wherein the gear ratio of said arm gear to said pair of flap gears is three to one.

3. The combination as set forth in claim 2 wherein the means for indexing said angular position of said central shaft comprises one or more rudder rigidly affixed to said central shaft.

4. The combination as set forth in claim 2 wherein the means for indexing said angular position of said central shaft comprises a fluid stream direction sensor, a transmitter and a servomotor, said servomotor rotating said central shaft per fluid direction change.

5. The combination as set forth in claim 2 wherein said central shaft is indexed to a constant fluid stream direction and affixed at said indexed position.

* * * * *